United States Patent
Smith et al.

(10) Patent No.: US 10,127,244 B2
(45) Date of Patent: Nov. 13, 2018

(54) SYSTEMS AND METHODS FOR DYNAMIC DATA STORAGE

(71) Applicant: HARRIS CORPORATION, Melbourne, FL (US)

(72) Inventors: Wayne B. Smith, Melbourne Beach, FL (US); Christopher T. Dowin, Palm Bay, FL (US); Ryan E. Sharpe, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 292 days.

(21) Appl. No.: 14/296,050

(22) Filed: Jun. 4, 2014

(65) Prior Publication Data

US 2015/0356114 A1    Dec. 10, 2015

(51) Int. Cl.
*G06F 17/30* (2006.01)
*G06F 21/62* (2013.01)
*H04L 29/06* (2006.01)

(52) U.S. Cl.
CPC .. *G06F 17/30194* (2013.01); *G06F 17/30076* (2013.01); *G06F 21/6218* (2013.01);
(Continued)

(58) Field of Classification Search
CPC ......... G06F 17/30893; G06F 17/30156; G06F 17/30805; G06F 17/218; G06F 17/30194; G06F 17/30076
(Continued)

(56) References Cited

U.S. PATENT DOCUMENTS 5,832,496 A * 11/1998 Anand ............ G06F 17/30554
5,870,746 A *  2/1999 Knutson ......... G06F 17/30554
(Continued)

FOREIGN PATENT DOCUMENTS

WO    WO 00/04681    1/2000

OTHER PUBLICATIONS

Subashini, S., et al., "A Metadata Based Storage Model for Securing Data in Cloud Environment," IEEE Computer Society, 2011 Intenrational Conference on Cyber-Enabled Distributed Computing and Knowledged Discovery, 978-0-7695-4557-8/11 copyright 2011 IEEE.

(Continued)

*Primary Examiner* — Hosain T Alam
*Assistant Examiner* — Saba Ahmed
(74) *Attorney, Agent, or Firm* — Fox Rothschild LLP; Robert J. Sacco; Carol E. Thorstad-Forsyth

(57) ABSTRACT

Systems (100) and methods (1000) for dynamic data storage within a network. The method comprising: receiving at least one first data file (202) comprising first data (302-320); segmenting the first data so as to form a plurality of first data segments (208); processing each of the first data segments to transform at least one first attribute of a plurality of attributes thereof so as to form a second data segment (210); storing the second data segments respectively in a plurality of different data stores (116-120); and dynamically changing physical locations where the second data segments are stored in response to an occurrence of a first trigger event. In some scenarios, the method steps may be iteratively repeated in response to one or more second trigger events (which may be the same as or different than the first trigger event).

15 Claims, 7 Drawing Sheets

(52) U.S. Cl.
CPC .......... *H04L 63/0428* (2013.01); *H04L 63/14* (2013.01); *H04L 63/1441* (2013.01); *H04L 65/601* (2013.01); *G06F 2221/2107* (2013.01)

(58) Field of Classification Search
USPC ........................................................ 707/756
See application file for complete search history.

(56) References Cited

U.S. PATENT DOCUMENTS

| | | | | |
|---|---|---|---|---|
| 6,704,747 | B1* | 3/2004 | Fong | G06F 17/30893 |
| 6,772,413 | B2* | 8/2004 | Kuznetsov | G06F 8/51 |
| | | | | 709/231 |
| 6,826,541 | B1* | 11/2004 | Johnston | G06Q 30/02 |
| | | | | 702/179 |
| 8,805,715 | B1* | 8/2014 | Jones | G06Q 30/02 |
| | | | | 705/14.66 |
| 9,124,671 | B2* | 9/2015 | Roth | H04N 21/2343 |
| 2001/0056504 | A1* | 12/2001 | Kuznetsov | G06F 8/30 |
| | | | | 719/310 |
| 2005/0273772 | A1* | 12/2005 | Matsakis | G06F 8/41 |
| | | | | 717/136 |
| 2008/0270426 | A1* | 10/2008 | Flake | G06Q 90/00 |
| 2009/0106178 | A1* | 4/2009 | Chu | G06N 99/005 |
| | | | | 706/14 |
| 2009/0222596 | A1* | 9/2009 | Flynn | G06F 3/061 |
| | | | | 710/22 |
| 2009/0259934 | A1* | 10/2009 | Prisament | G06F 17/30893 |
| | | | | 715/234 |
| 2009/0319544 | A1* | 12/2009 | Griffin | G06F 17/30563 |
| 2010/0082547 | A1* | 4/2010 | Mace | G06F 11/1435 |
| | | | | 707/648 |
| 2011/0106904 | A1* | 5/2011 | Resch | G06F 11/1076 |
| | | | | 709/207 |
| 2011/0110515 | A1* | 5/2011 | Tidwell | H04N 21/23109 |
| | | | | 380/200 |
| 2012/0016655 | A1* | 1/2012 | Travieso | G06F 17/2827 |
| | | | | 704/2 |
| 2012/0259854 | A1* | 10/2012 | Hsiao | G06Q 30/0251 |
| | | | | 707/739 |
| 2012/0331088 | A1* | 12/2012 | O'Hare | G06F 21/6227 |
| | | | | 709/214 |
| 2013/0073821 | A1* | 3/2013 | Flynn | G06F 3/061 |
| | | | | 711/162 |
| 2013/0132365 | A1* | 5/2013 | Chang | G06Q 30/0241 |
| | | | | 707/710 |
| 2014/0279838 | A1* | 9/2014 | Tsirogiannis | G06F 17/30292 |
| | | | | 707/603 |

OTHER PUBLICATIONS

Applegate, Scott D., "The Principle of Maneuver in Cyber Operations," 2012 4th International Conference on Cyber Conflict, copyright 2012 NATO CCD COE Publications, Talinn.

Shen, F., et al., "On Post-Generation Data Operations in Secure Distributed Storage Systems with Internal Padding," 2010 10th IEEE International Conference on Computer and Information Technology (CIT 2010), IEEE Computer Society, 978-0-7695-4108-2/10 copyright 2010 IEEE.

* cited by examiner

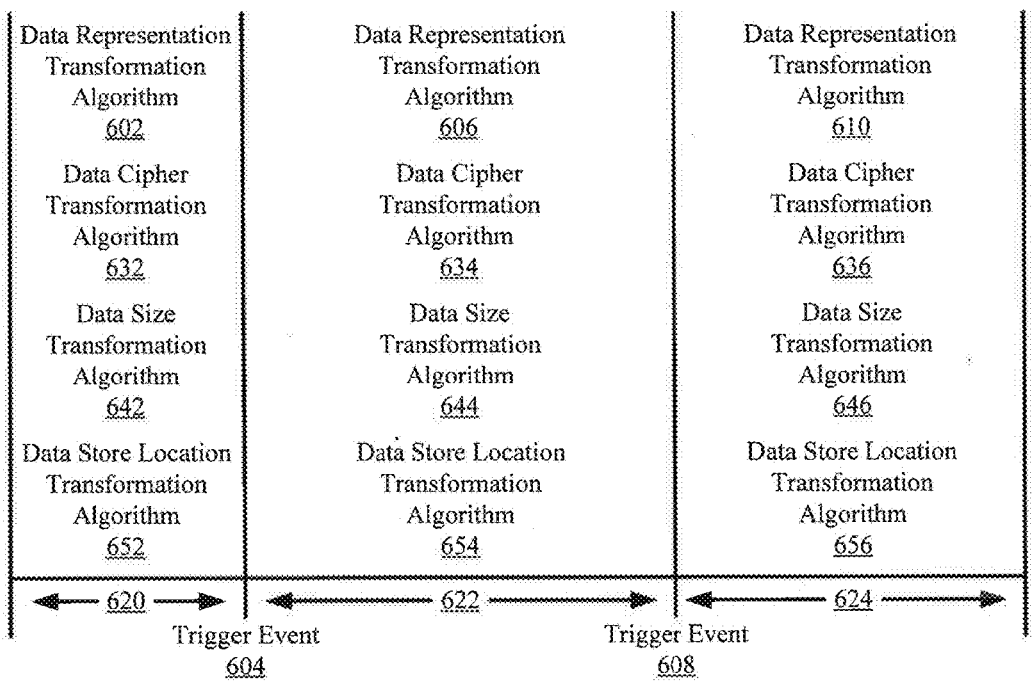

Storage Model 800
Data Segmentation 802:
    Algorithms 804:
        First Segmentation Algorithm and Initial Parameter Values;
        Second Segmentation Algorithm and Initial Parameter Values;
        Third Segmentation Algorithm and Initial Parameter Values;
        Pseudo-Random Function.
    Trigger Events 806:
    Rules 808:
        Apply the First Segmentation Algorithm to all data files having a particular size until a first trigger event occurs;
        Apply the Second Segmentation Algorithm only to data files comprising confidential communications after the first trigger event occurs;
        Apply the Third Segmentation Algorithm only to a portion of all data files sent within a particular talkgroup subsequent to an occurrence of a second trigger event;
        Randomly Change the Segmentation Algorithm in response the occurrence of trigger events of at least one defined type;
        Change at least one parameter value for the Second Segmentation Algorithm in response to a third trigger event using the Pseudo-Random Function.

Data Transformations 810:
    Data Representation Transformation 812:
        Algorithms 814;
        Trigger Events 816;
        Rules 818 (data format, file type, and character encoding).
    Data Cipher Transformation 820:
        Algorithms 822;
        Trigger Events 824;
        Rules 826 (encryption, encryption algorithm and/or parameter change, seed value change).
    Data Size Transformations 828:
        Algorithms 830;
        Trigger Events 832;
        Rules 834 (increase/inflate size, decrease/deflate).
    Data Storage Location Transformation 836:
        Algorithms 838;
        Trigger Events 840;
        Rules 842 (storage location, communications channels/paths).

FIG. 8

SYSTEMS AND METHODS FOR DYNAMIC DATA STORAGE

BACKGROUND OF THE INVENTION

Statement of the Technical Field

The inventive arrangements relate to computer network and data security, and more particularly to systems for using various data storage techniques so as to provide a computer network and/or data storage which is dynamically maneuverable to defend against malicious attacks.

Description of the Related Art

Current data storage mechanisms handle data in a static manner. For example, data is stored in a known location "indefinitely" as one contiguous piece of information. Encryption may be employed to provide a layer of security to the stored data. Still, even in these scenarios, all of the data is stored together in a given location, and therefore can be obtained and analyzed by an outside party. As such, the current state of the art is susceptible to malicious attacks in which unauthorized access to stored data occurs.

SUMMARY OF THE INVENTION

Embodiments of the present invention concern systems and methods for dynamic data storage within a network and/or an electronic device. The Methods comprise receiving at least one first data file comprising first data. The first data is then segmented so as to form a plurality of first data segments. Each of the first data segments is processed to transform at least one first attribute of a plurality of attributes thereof so as to form a second data segment. The first attribute includes, but is not limited to, a data format, a file type, an encoding scheme, a cryptographic scheme, or a data size. The first attributes of at least two first data segments may be transformed in accordance with the same or different algorithms. Subsequent to completion of the transformations, the second data segments are respectively stored in a plurality of different data stores. The physical storage locations of the second data segments are dynamically changed in response to an occurrence of a trigger event. The first attribute and/or a second different attribute may be transformed each time the physical storage location is changed for a respective one of the second data segments. Additionally, at least one of the first and second attributes may be periodically re-transformed in accordance with a transformation algorithm which is different than at least one transformation algorithm used in a previous transformation thereof.

In some scenarios, each of the first data segments is further processed to transform a second attribute that is different than the first attribute so as to form the second data segment. The first and second attributes are transformed by one or more electronic devices, such a single network node or two different network nodes. The transformation algorithms used to transform the first and second attributes may be synchronously or asynchronously changed during operation of the network.

BRIEF DESCRIPTION OF THE DRAWINGS

Embodiments will be described with reference to the following drawing figures, in which like numerals represent like items throughout the figures, and in which:

FIG. 5 is a schematic illustration that is useful for understanding file transformation operations performed in the system of FIG. 1.

FIG. 6 is a schematic illustration that is useful for understanding a dynamic change in file transformation algorithms employed in the system of FIG. 1.

FIG. 8 is a schematic illustration of an exemplary storage model that is useful for understanding the present invention.

DETAILED DESCRIPTION

Figure 1:
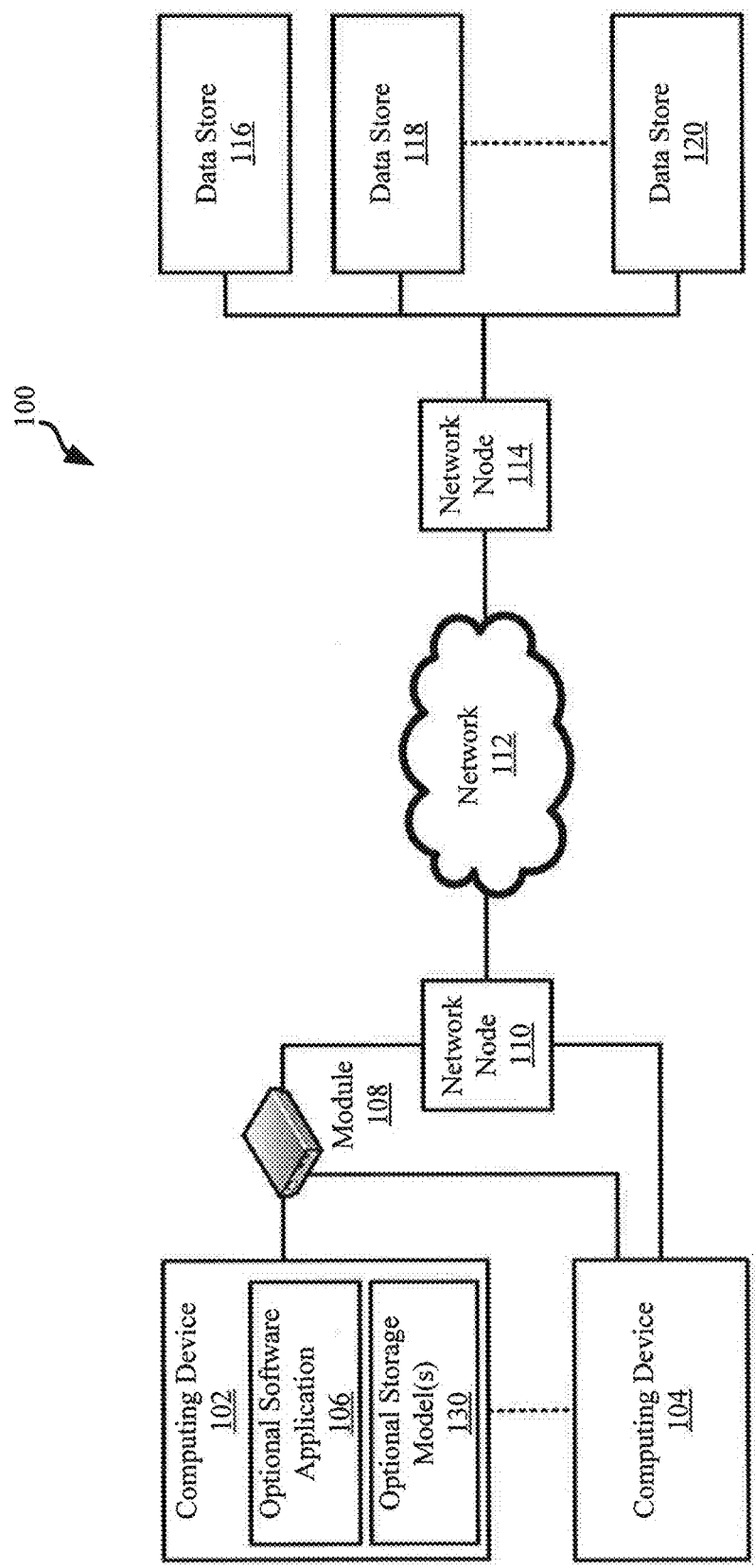
FIG. 1 is a schematic illustration an exemplary architecture for a system implementing the present invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Overview of Present Invention

The present invention generally concerns systems and methods for dynamic data storage. The methods involve selectively segmenting and/or transforming data contained in a data file. The segmenting involves breaking the data contained in the data file into a plurality of data segments. The transformations are performed to change data representations of the data segments, physical locations at which the data segments are stored or are to be stored, data ciphers used to encrypt the data segments, data sizes of the data segments and/or access to the data segments. The listed transformations can be performed by the same network node or a plurality of network nodes such that multiple transforms are performed to the data en-route to its storage location.

In some scenarios, the data representation transformation is achieved by obscuring data in the open, i.e., storing data in various modified formats and periodically changing the formats of the stored data. The physical location transformation is achieved by periodically maneuvering data across multiple available storage mechanisms (i.e., periodically changing the physical locations where each data segment is stored in a network). The data cipher based transformation is achieved by changing plaintext into cipher text, re-encrypting the data using an algorithm or parameter value different from that previously used to encrypt the data, and/or substituting at least a portion of the data with other data. The data size transformation is achieved by adding or removing data from a data file. The data access transformation is achieved by manipulating access to the data (e.g., unauthorized access attempts to data returns improperly translated data).

Dynamic Data Storage System

Referring now to FIG. 1, there is provided a schematic illustration of an exemplary architecture for a system 100 that is useful for understanding the present invention. System 100 is generally configured to protect end user data stored therein. In this regard, at least the location in which user data is stored is dynamically selected and changed over time in accordance with a pre-defined algorithm. The dynamic change in data storage locations assists in thwarting malicious access to the corresponding user data. As a result, system 100 has an increased data "trust of access" feature as compared to conventional data storage systems. Also, in system 100, the cost for attackers to re-create the stored user data in its original form is dramatically increased, which will become more evident as the discussion progresses.

The present invention will now be described with reference to a network based system. However, the present invention is not limited in this regard. For example, the dynamic data storage features thereof can be employed in a single electronic device, as opposed to multiple devices connected via network based communication links.

As shown in FIG. 1, the system 100 comprises a plurality of computing devices 102-104, a module 108, network nodes 110, 114, a network 112 (e.g., the Internet or Intranet), and a plurality of data stores 116420. Each of the computing devices can include, but is not limited to, a personal computer, a laptop computer, a desktop computer, a personal digital assistant, or a smart phone. Each of the listed types of computing devices is well known in the art, and therefore will not be described herein. In some cases, the computing device may have installed thereon a software application 106 implementing methods of the present invention for providing dynamic data storage. The operations of such a software application 106 will become evident as the discussion progresses.

Operations of system 100 will now be described in relation to FIGS. 1-10. During use of system 100, a computing device 102 generates first user data. The first user data is then placed into a first file format (e.g., a .pdf file format or a .doc file format) so as to form a first data file 202. The first data file 202 may then be processed by the software application 106, a module 108, or a network node 110-114 so as to place it into a second file format suitable for thwarting unauthorized access thereto. The second file format may be achieved by processing the first data file 202 in accordance with algorithms specified by a storage model (e.g., storage model 130 of FIG. 1). Storage models will be described in detail below. Still, it should be understood that the storage model generally specifies the manner in which the first data file 202 is to be segmented in functional block 204 and/or transformed in functional block 206 prior to storage thereof in one or more data stores 116-120. The data stores 116-120 include, but are not limited to, databases, flash drives, hard drives, magnetic tape drives, optical drives, compact discs, network storage drives, local storage drives, distributed data stores (e.g., public or private cloud based data stores), and/or virtual infrastructure data stores.

The segmentation performed in functional block 204 may be performed using at least a portion of the first data file 202 received thereat. Alternatively, the segmentation operations of functional block 204 may be bypassed such that the first data file 202 is not segmented. The decision to segment the first data file 202 is based on: information contained in a storage model (e.g., storage model 130 of FIG. 1); the size of the first data file; the type of information represented by the data contained in the first data file (e.g., secret, confidential or non-confidential); and/or information identifying the device and/or the type of device from which the first data file was received. In some cases, the segmentation is performed in a manner so as to provide a certain speed of access to the data contained in the first data file 202. The speed of access is at least partially defined by the complexity of the segmentation applied to the data file 202.

Figure 3:
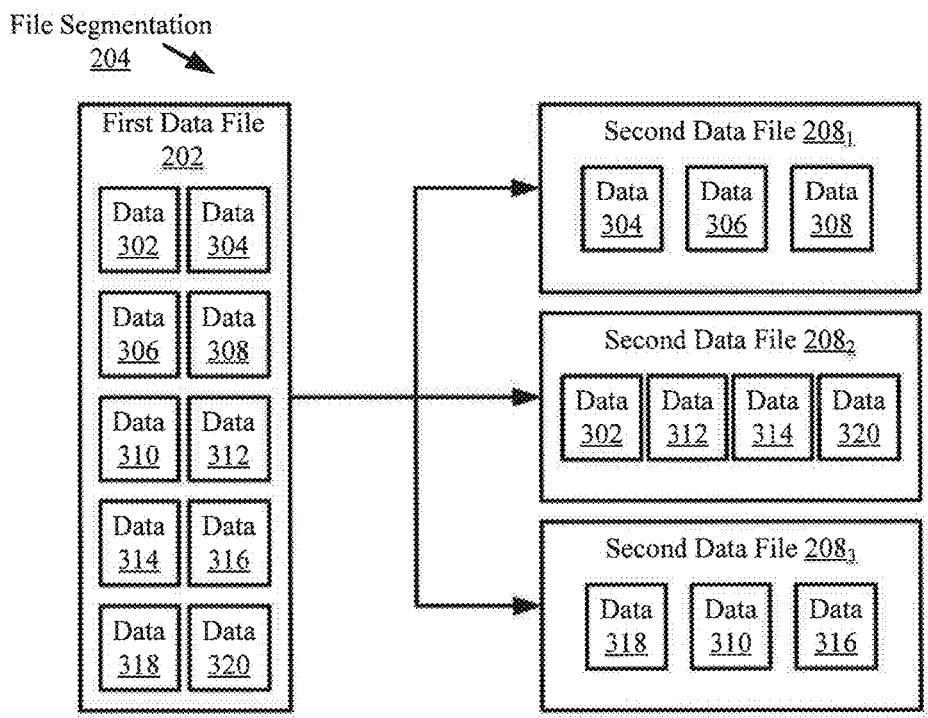
FIG. 3 is a schematic illustration that is useful for understanding data segmentation operations of the system shown in FIG. 1.

The segmentation operations involve processing the first data file 202 so as to generate a plurality of second data files $208_1$, $208_2$, and $208_3$ (collectively referred to as second data files 208). The first data file 202 includes a plurality of data elements 302-320. Each data element 302-320 includes at least one bit or byte of information. Each of the second data files $208_1$, $208_2$, $208_3$ includes one or more of the data elements 302-320 arranged in the same or different order as that of the first data file 202. For example, as shown in FIG. 3, second data file $208_1$ comprises data elements 304, 306 and 308 arranged in the same sequential order as that in the first data file 202. In contrast, the second data file $208_3$ comprises data elements 318, 310, 316 arranged in a different order (or non-sequential order) than that in the first data file 202. The present invention is not limited to the particulars of this example. Although not shown in FIG. 3, one or more of the data elements may be repeated in one or more of the second data files. Alternatively or additionally, one or more of the second data files can include data elements from two or more first data files and/or other information added thereto.

At least some of the second data files include the same number of data elements and/or a different number of data elements with respect to each other. For example, as shown in FIG. 3, each of the second data files $208_1$ and $208_3$ includes three data elements 304/306/308 or 318/310/316 which were contained in the first data file 202. In contrast, the second data file $208_2$ includes four data elements 302/

312/314/320 which were contained in the first data file 202. The present invention is not limited to the particularities of this example.

The selection of which and how many data elements are to be contained in each second data file $208_1$, $208_2$, $208_3$ is made in accordance with at least one file segmentation algorithm specified in the storage model (e.g., storage model 130 of FIG. 1). The file segmentation algorithm can include, but is not limited to, a pseudo-random number based algorithm, a random number based algorithm, a chaotic number based algorithm, or other mathematical based algorithm (e.g., a primary or polynomial based mathematical function). In some scenarios, the data contained in the first data file 202 is segmented based on the type of information represented thereby. For example, if the information is of a first level, then a chaotic number based algorithm is used and at least one first data store. In contrast, if the information is only of a second level, then a pseudo-random based algorithm is used and at least one second data store (which can be the same as or different than the first data store). If the information is non-confidential information, then an algorithm is used for simply segmenting the data into segments of N sequentially ordered bits, where N is an integer. The present invention is not limited to the particulars of this example.

Figure 4:
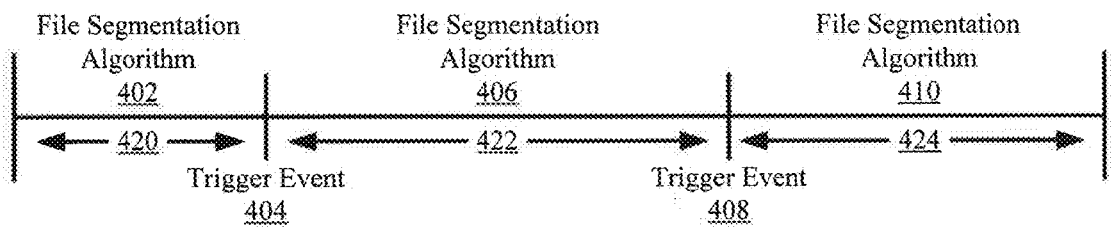
FIG. 4 is a schematic illustration that is useful for understanding a dynamic change in file segmentation algorithms employed in the system of FIG. 1.

Notably, the file segmentation algorithm used in relation to a plurality of incoming data files can be the same for a first period of time and/or different for a subsequent second period of time. For example, as shown in FIG. 4, a file segmentation algorithm 402 is used during a first period of time 420. At the end of the first period of time 420, a trigger event 404 occurs. Trigger events will be described in detail below. Still, it should be understood that trigger event 404 may include, but is not limited to, an expiration of the first period of time. In response to the trigger event 404, the file segmentation algorithm 402 is dynamically changed to file segmentation algorithm 406. File segmentation algorithm 406 is a different algorithm than file segmentation algorithm 402. The file segmentation algorithm 406 is then used during a second period of time 422. When a trigger event 408 occurs (e.g., a file has been received that includes top secret information), the file segmentation algorithm 406 is dynamically changed to file segmentation algorithm 410. File segmentation algorithm 410 is a different algorithm than file segmentation algorithm 406. The file segmentation algorithm 410 is then used throughout a third period of time 424. The present invention is not limited to the particulars of this example.

Figure 2:
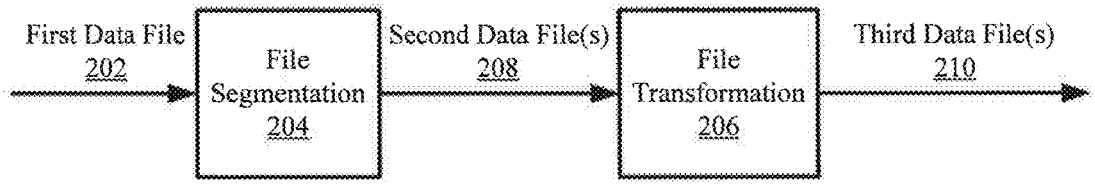
FIG. 2 is a schematic illustration that is useful for understanding data segmentation and transformation operations of the system shown in FIG. 1.

After the segmentation of the first data file 202 is completed, file transformation operations are performed, as shown by functional block 206 of FIG. 2. The file transformation performed in functional block 206 involves processing the second data files $208_1$, $208_2$, $208_3$ for various purposes. More particularly, the file transformation is performed to determine a variable Distance Vector ("DV") for each second data file $208_1$, $208_2$, $208_3$. The DV is defined as the summation of all of a plurality of Data Segment Vectors ("DSVs") applied to a given data set at a point in time. System 100 will maneuver the DV's parameters over a period of time as will become more evident below. The DSV is defined as a vector of arbitrary dimension that defines various attributes of a data segment at rest state. The attributes include, but are not limited to, data format, file type, encoding scheme, text state (i.e., plain text or cipher text), cryptographic scheme, compression scheme, inflation scheme, and storage location.

Accordingly as shown by FIG. 5, each second data file $208_1$, $208_2$, $208_3$ is processed to change its data representation, data cipher, data size and/or data store location. In this regard, a unique set of transformations 502, 504, 506, 508 is applied to the data elements of each second data file $208_1$, $208_2$, $208_3$ so as to produce a DSV therefore. The second data files will have a DSV which is different as compared to the DSVs produced for the other second data files. The DSVs are then respectively used to define transformations and storage of the second data file $208_1$, $208_2$, $208_3$. In some cases, the DSVs are generated so as to provide a certain speed of access to the data contained in the first data file 202 and/or the second data files $208_1$, $208_2$, $208_3$. The speed of access is at least partially defined by the complexity of the transformations 502, 504, 506, 508 to be applied to the data files.

As shown in FIG. 5, each second data file $208_1$, $208_2$, $208_3$ can be processed in functional block 502 to change its data format (e.g., remove paragraphing, spaces, etc.), file type (e.g., from a .doc file type to a .pdf file type), and/or character encoding scheme (e.g., change an ASCII coding scheme to an Extended Binary Coded Decimal Interchanging coding scheme). The data format, file type and/or character encoding scheme can be changed the same way or a different way for some or all of the second data files $208_1$, $208_2$, $208_3$ generated from the first data file 202.

Notably, the data format, file type, and character encoding scheme can be changed in accordance with a Data Representation Transformation ("DRT") algorithm specified by the storage model (e.g., storage model 130 of FIG. 1). The DRT algorithm used in relation to a plurality of incoming data files can be the same for a first period of time and/or different for a second period of time. A dynamic change in DRT algorithm can occur in response to a trigger event. Exemplary trigger events will be described in detail below. Still, it should be understood that the storage model specifies which trigger events of a plurality of trigger event are to cause data storage maneuvering (e.g., such as a dynamic change in the DRT algorithm and/or parameter value(s) thereof). Logical rules are also provided in the storage model defining the desired DRT behavior of system 100.

As shown by functional block 504 of FIG. 5, each second data file $208_1$, $208_2$, $208_3$ can also be processed to change its (a) plaintext to cypher text or (b) change the cryptographic scheme used to encrypt the plaintext. Both types of changes (a) and (b) can be performed for some or all of the second data files $208_1$, $208_2$, $208_3$ generated from the first data the 202. The selection of which second data files the operations of functional block 504 are to be applied is made in accordance with a Data Cipher Transformation ("DCT") algorithm specified in the storage model (e.g., storage model 130 of FIG. 1). Also, the selection of which cryptographic scheme(s) should be employed during the operations of functional block 504 is also made in accordance with the DCT algorithm specified in the storage model. The cryptographic scheme can be modified by changing the cryptographic algorithm, changing a seed value and/or changing other parameter values for a currently employed cryptographic algorithm. Any known or to be known cryptographic algorithm can be used herein without limitation.

Notably, the DCT algorithm used in relation to a plurality of incoming data files can be the same for a first period of time and/or different for a second period of time. A dynamic change in DCT algorithm can occur in response to a trigger event. Exemplary trigger events will be described in detail below. Still, it should be understood that the storage model (e.g., storage model 130 of FIG. 1) specifies which trigger events of a plurality of trigger event are to cause data storage maneuvering (e.g., such as changing of the cryptographic algorithm, seed value and/or other parameter values). Logical rules are also provided in the storage model defining the desired DCT behavior of system 100.

As shown by functional block 506 of FIG. 5, each second data file 208$_1$, 208$_2$, 208$_3$ can be further processed to change its data size. The data size can be increased or inflated by adding dummy data or other data thereto (e.g., valid data, invalid data, meaningful data, and/or non-meaningful data). In contrast, the data size can be decreased or deflated by compressing the data file so as to remove any unnecessary data therefrom. Any known or to be known data compression technique can be used herein without limitation. The selection of which second data files the operations of functional block 506 are to be applied is made in accordance with information specified in the storage model (e.g., storage model 130 of FIG. 1). Also, the selection of which Data Size Transformation ("DST") algorithm(s) should be employed during the operations of functional block 506 for each second data file is also made in accordance with information specified in the storage model.

Notably, the DCT algorithm used in relation to a plurality of incoming data files can be the same for a first period of time and/or different for a second period of time. A dynamic change in DCT algorithm can occur in response to a trigger event. Exemplary trigger events will be described in detail below. Still, it should be understood that the storage model (e.g., storage model 130 of FIG. 1) specifies which trigger events of a plurality of trigger events are to cause data storage maneuvering (e.g., such as changing of the DCT algorithm and/or parameter values thereof). Also, logical rules are provided in the storage model defining the desired DST behavior of system 100.

As shown by functional block 508 of FIG. 5, each second data file 208$_1$, 208$_2$, 208$_3$ can be further processed to change its storage location. Advantageously, the storage locations of at least two second data files are changed so as to be different from one another. In effect, these second data files will be subsequently and respectively distributed to a plurality of data stores 116, 118 and/or 120 for storage therein. Thus, unlike conventional data storage systems (such as that discussed in the background section of this document), the data elements of the first data file 202 will not be stored as one contiguous piece of information in a single data store. Also, the data store location for at least one second data file will be dynamically modified over time (i.e., the data is not stored indefinitely in a known location, as is done in conventional systems). As a result, the present invention handles data storage in a dynamic manner, as opposed to the static manner performed in conventional data storage systems. This is an important feature of the present invention since it increases the difficulty and cost associated with obtaining unauthorized access to the data. Each time the data store location is dynamically modified one or more other transformations 502-508 may also be performed to change attributes of the respective second data file. Additionally or alternatively, the second data files may be re-segmented prior to performance of the other transformations 502-508.

A distance transformation may also be performed in functional block 508. The distance transformation is performed to vary the paths and/or communication channels that the second data files travel through/over the network to their respective data stores for storage. For example, if two second data files are to be stored in data stores located within the same facility, then the second data files may be routed along two different paths through the network thereto or communication channels of the network thereto. The paths and/or communication channels may have the same or different number of nodes between the transforming device and the access point device of the facility. The present invention is not limited to the particulars of this example.

The data store location transformations made in functional block 508 are achieved using a Data Store Location Transformation ("DSLT") algorithm specified in the storage model (e.g., storage model 130 of FIG. 1). The selection of which DSLT algorithm(s) should be employed during the operations of functional block 508 at any given time for each second data file is also made in accordance with information specified in the storage model. Notably, the DSLT algorithm used in relation to a plurality of incoming data files can be the same for a first period of time and/or different for a second period of time. A dynamic change in DSLT algorithm can occur in response to a trigger event. Exemplary trigger events will be described in detail below. Still, it should be understood that the storage model (e.g., storage model 130 of FIG. 1) specifies which trigger events of a plurality of trigger events are to cause data storage maneuvering (e.g., such as changing of the DSLT algorithm and/or parameter values thereof). Also, logical rules are provided in the storage model defining the desired DSLT behavior of system 100.

As noted above, the file transformation algorithms employed in functional blocks 502-508 can be the same for a first period of time and/or different for a second period of time. For example, as shown in FIG. 6, a DRT algorithm 602, a DCT algorithm 632, a DST algorithm 642, and a DSLT algorithm 652 are used during a first period of time 620. At the end of the first period of time 620, a trigger event 604 occurs (e.g., expiration of the first period of time). In response to the trigger event 604, at least one of the algorithms 602, 632, 642, 652 is dynamically changed to a new algorithm. In the case of FIG. 6, the DRT algorithm 602 is changed to DRT algorithm 606. The DCT algorithm 632 is changed to DCT algorithm 634. The DST algorithm 642 is changed to DST algorithm 644. The DSLT algorithm 652 is changed to DSLT algorithm 654. Each of the new algorithms 606, 634, 644, 654 is a different algorithm than the corresponding original algorithm 602, 632, 642, or 652. The new algorithms are then used during a second period of time 622. When a trigger event 608 occurs (e.g., a file has been received that includes top secret information), the algorithms 606, 634, 644, 654 are dynamically changed to other algorithms. Specifically, the DRT algorithm 606 is changed to the DRT algorithm 610. The DCT algorithm 634 is changed to DCT algorithm 636. The DST algorithm 644 is changed to DST algorithm 646. The DSLT algorithm 654 is changed to DSLT algorithm 656. The algorithms 610, 636, 646, 656 are different than the algorithms 606, 634, 644, 654, respectively. The algorithms 610, 636, 646, 656 are then used throughout a third period of time 624. The present invention is not limited to the particularities of this example.

In this way, the same or different DRT, DCT, DST and/or DSLT algorithm(s) can be used for transforming various attributes of at least two second data files 208$_1$, 208$_2$, 208$_3$ generated using the first data file 202. Similarly, the same or different DRT, DCT, DST and/or DSLT algorithm(s) can be used for transforming various attributes of at least one second data file 208$_1$, 208$_2$, 208$_3$ generated using the first data file 202 and at least one second data file (not shown) using another data file (not shown) input into functional block 204 subsequent to the first data file 202.

Figure 7:
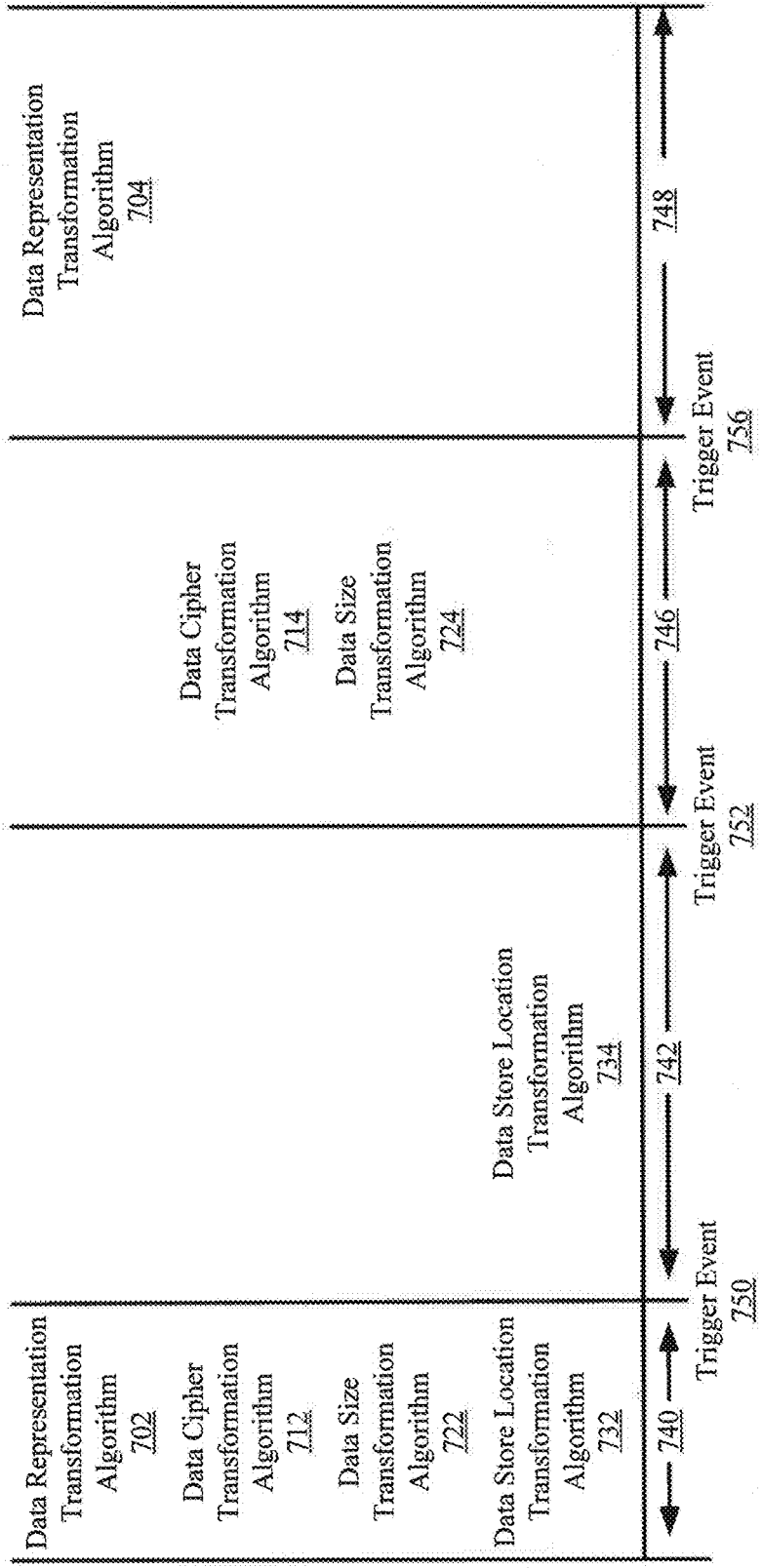
FIG. 7 is a schematic illustration that is useful for understanding a dynamic change in file transformation algorithms employed in the system of FIG. 1.

The DRT, DCT, DST and/or DSLT algorithms need not be dynamically modified concurrently with each other. Instead, at least two of the algorithms can be changed at different times in response to the occurrence of different trigger events. For example, as shown in FIG. 7, four algorithms 702, 712, 722, 732 are used during a first period of time 740. In response to a trigger event 750, only the DSLT algorithm 732 is dynamically changed to a new DSLT algorithm 734. As such, the new DSLT algorithm 734 is used during a second period of time 742 along with the original algorithms 702, 712, 722. Sometime later another trigger event 752 occurs. Both algorithms 712 and 722 are changed to new respective algorithms 714, 724 in response to the trigger event 752. Accordingly, algorithms 702, 714, 724 and 734 are used during a third period of time 746. Thereafter, the DRT algorithm 702 is changed to a new DRT algorithm 704 in response to yet another trigger event 756. In effect, algorithms 704, 714, 724, 734 are used during a fourth period of time 748. The present invention is not limited to the particulars of this example.

Referring again to FIG. 2, the file transformation operations 206 result in the formation of third data files 210. Each third data file 210 comprises the first data file 202 or a respective second data file with at least one modified attribute. The third data files 210 are then distributed to their corresponding data store locations. For example, one data file is sent to data store 116 for storage therein, while another data file is sent to the data store 120 for storage therein. As noted above, the distribution and traveling paths for the third data files 210 are controlled by DSLT algorithms contained in the storage model.

As should be understood, the segmentations and/or transformations applied to the data files can be reversed or undone such that the first data file 202 can be recreated in its original state and provided to an end user upon request. In this regard, information tracking segmentations and transformations is acquired, stored and/or used by the device performing the reverse segmentation and/or transformation operations. Again, the speed of access can be set through selection of algorithms to be applied to a particular set of data. The speed of access is relatively slow when the algorithms employed in functional blocks 204 and 206 are complex, and relatively fast when the algorithms are less complex or simple.

In some scenarios, the third data files 210 are stored in a redundant and/or fault tolerant manner so as to increase availability thereof. Any known or to be known redundant storage technique can be used herein without limitation. For example, the well-known Redundant Array of Inexpensive Disks ("RAIDs") technique may be employed for achieving the redundant data storage.

Also, various deception techniques may be employed by system 100. Any known or to be known deception techniques can be used herein without limitation. For example, unauthorized access attempts return data shadows or decoys such that the sources thereof can be detected. In the data shadow case, data accessed on a storage medium will result in un-translated data (local physical access). Also, unauthorized data access through the controller returns improperly translated data (remote access). The present invention is not limited in this regard.

Trigger Events

As noted above, the dynamic changes to the segmentation and transformation algorithms 502-508 are controlled by at least one reactive trigger event. A reactive trigger event is a purely spontaneous or user initiated event that causes a change to occur in relation to the dynamic modifications described herein. Stated differently, it can be said that the trigger event causes the network to maneuver in a new way that is different than at a previous time (i.e., before the occurrence of the reactive trigger). For example, during a first period of time, a storage model can cause a first segmentation algorithm (e.g., segmentation algorithm 402 of FIG. 4) and/or a first DRT algorithm (e.g., DRT algorithm 602 of FIG. 6) to be used; but after the trigger event, the storage model can cause a second segmentation algorithm (e.g., algorithm 422 of FIG. 4) and a second DRT algorithm (e.g., DRT algorithm 606 or 610 of FIG. 6) to be used instead. Similarly, during the first period of time, a storage model can cause first DCT, DST, and DSLT algorithms (e.g., algorithms 632, 642, 652 of FIG. 6) to be used; but after the trigger event, the storage model can instead cause second DCT, DST, and DSLT algorithms (e.g., algorithms 634, 644, 654 of FIG. 6) to be used.

In its simplest form, a reactive trigger event can be based on a packet inspection based scheme, a congestion level based scheme, a heuristic algorithm based scheme, and/or a Network Based Attack ("NBA") analysis based scheme. The packet inspection based scheme can involve analyzing a packet to obtain an identifier identifying an origin of the packet, a destination of the packet, a group to which the origin or destination device belongs, and/or a type of payload contained in the packet. The packet inspection based scheme can also involve analyzing the packet to determine whether a code word is contained therein or absent therefrom. Techniques for achieving such a packet inspection are well known in the art. Any such technique that is now known or known in the future can be used with the present invention without limitation. In some embodiments, a reactive trigger event occurs when a value of the identifier matches a predefined value.

In the packet inspection scenarios, the inclusion of a particular type of content in a packet serves as a trigger or as a parameter for selecting a timing scheme on which a trigger is based. For example, a trigger event could be defined as occurring (a) when a particular person of an entity (e.g., a commander of a military unit) communicates information to other members of the entity, and/or (b) when a particular code word is contained within the packet. Alternatively or additionally, a trigger event could be defined as occurring at the expiration of every N second time interval as defined by a timing scheme selected in accordance with a particular packet inspection application, where N is an integer. In this regard, it should be understood that in some scenarios a first timing scheme can be selected (a) when a first person of an entity (e.g., a commander of a military unit) requests a communication session with other members of the entity or (b) when a particular code word exists within a packet. A second different timing scheme can be selected (a) when a second person of an entity (e.g., a lieutenant commander of a military unit) requests a communication session with other members of the entity or (b) when a second code word exits within a packet, and so on. Embodiments of the present invention are not limited to the particularities of the above provided examples. In this regard, it should be understood that other content included in a packet can define a trigger event. For example, if the payload of a packet includes sensitive or confidential information, then a new storage model, segmentation algorithm, translation algorithm, and/or algorithm parameter can be selected in accordance with the level of sensitivity or confidentiality of said information.

For such time-based trigger arrangements, one or more of the storage model, segmentation algorithm, transformation algorithms, and algorithm parameters could change every N (e.g., 60) seconds in accordance with a predetermined clock time. In some embodiments, all of the segmentation algorithms, transformation algorithms and/or algorithm parameters can change concurrently so that the changes are synchronized. In a slightly more complex embodiment, a time-based trigger arrangement can also be used, but a different unique trigger time interval can be selected for each storage model, segmentation algorithm, transformation algorithm and/or algorithm parameter thereof.

It will be appreciated that scenarios which rely upon clock time as a trigger mechanism, it is advantageous to provide synchronization as between the clocks in various data processing devices (e.g., devices 102-106, 108, 110 and/or 114 of FIG. 1) to ensure that all data can be reconstructed in their original formats. Synchronization methods are well known and any suitable synchronization mechanism can be used for this purpose. For example, the devices could be synchronized by using a highly accurate time reference such as a GPS clock time. Alternatively, a unique wireless synchronization signal could be broadcast to each of the modules from a central control facility.

The congestion level based scheme can involve: monitoring and tracking the level of congestion within a computer network; comparing a current level of congestion with a threshold value; and selecting a storage model from a plurality of storage models based on the results of the comparison. In some scenarios, a new storage model is selected when the current level of congestion is equal to, greater than or less than the threshold value. In this way, a change of a storage model, segmentation algorithm, transformation algorithm and/or algorithm parameter occurs at apparently erratic time intervals based on changes in the level of congestion within a computer network.

The heuristic algorithm based scheme can involve analyzing a network to determine a state thereof. Such a network analysis can involve monitoring traffic patterns (e.g., the number of users), protocol patterns, and/or entropy patterns (i.e., who is communicating with who) of a network at particular times of a day. A traffic pattern can be determined by collecting information about network equipment usage (e.g., a processor's usage) and a number of connections that exist from a network device (e.g., a network server). The collected information can be compared against the contents of a pre-defined table or matrix to identify which of a plurality of possible traffic patterns currently exists within a computer network. Based at least on the results of this comparison operation, a new storage model, segmentation algorithm, transformation algorithm, and/or algorithm parameter can be selected for utilization in the computer network.

In some heuristic scenarios, the storage models can be configured such that a constant high level of traffic is maintained within a computer network despite changes in the amount of actual traffic therein. The constant high level of traffic is maintained by adjusting (i.e., increasing or decreasing) a noise level of a network in accordance with the amount of actual traffic therein. Consequently, the amount of actual traffic and the type of traffic pattern at any given time is masked.

A protocol pattern can be determined by collecting information about user activities related to network resources. Such information can include, but is not limited to, a history of user activities for at least one user of a computer network, times that user activities start, times that user activities stop, times that user activities have elapsed, and information identifying concurrent user activities being performed by at least one user of a computer network. The collected information can be analyzed to determine if a certain protocol pattern currently exists. If it is determined that a particular protocol pattern currently exists, then a new storage model, segmentation algorithm, transformation algorithm, and/or algorithm parameter can be selected for utilization in the computer network. In this way, a dynamic data storage based change occurs at apparently erratic time intervals based on changes in protocol patterns (more particularly, changes in user activities).

The entropy pattern can be determined by collecting information about who is communicating with each other over the computer network. Based on the collected information, a new storage model is selected from a plurality of storage models for utilization in the computer network. In this scenario, a dynamic data storage change occurs at apparently erratic time intervals based on changes of the parties participating in communication sessions.

The NBA analysis is performed for purposes of determining the level of an NBA, a type of an NBA, and/or the number of NBA attacks currently being waged on a computer network. Such NBA analyses are well known in the art, and therefore will not be described herein. Still, it should be understood that such NBA analyses can involve: monitoring and tracking attack events within a computer network; and performing LUT operations for purposes of determining the level of an NBA attack and/or the type of an NBA attack. Any NBA analysis technique that is now known or known in the future can be used with the present invention without limitation. Once the NBA analysis is completed, a new storage model, segmentation algorithm, transformation algorithm and/or algorithm parameter can be selected for utilization in the computer network based on the results of the NBA analysis. For example, if it has been determined that an NBA is a low level NBA and is of a first type, then a first storage model is selected from a plurality of storage models. In contrast, if it has been determined that the NBA is a high level NBA and/or is of a second type, then a second different storage model is selected from the plurality of storage models. In this scenario, a dynamic data storage based change occurs at apparently erratic time intervals based on changes in the level of NBA attacks and/or the types of NBA attacks. Additionally or alternatively, a new storage model, segmentation algorithm, transformation algorithm, and/or algorithm parameter can be selected when two or more NBA attacks of the same or different levels and/or types are currently being waged on the computer network. In this scenario, a dynamic data storage based change occurs at apparently erratic time intervals based on changes in the number of attacks currently being performed.

In some scenarios, an NBA can be identified by a network security software suite. Alternatively, the NBA can be identified upon the receipt of a data packet at a device (e.g., devices 102-106, 108, 110 and/or 114 of FIG. 1). Regardless of the basis for identifying an NBA, the existence of such NBA can serve as a reactive trigger event as described above.

Reactive trigger events based on the above described schemes can cause the same types of network maneuvers. For example, storage models, segmentation algorithms, transformation algorithms and/or algorithm parameters could remain stable (i.e., unchanged) except in the case where one or more of the following is detected: a packet or data file having a particular origin or destination; a code word contained in a packet or data file; secret or confidential information contained in a packet or data file; a particular level of congestion within a network (e.g., network 112 of FIG. 1); a particular traffic pattern within the network; a particular protocol pattern within the network; a particular entropy pattern within the network; an NBA of a particular level and/or type within the network; and a particular number of NBAs currently being waged on the network. Such an arrangement might be chosen, for example, in computer networks where frequent data storage maneuvering is desirable so as to increase the security of stored data.

Alternatively, reactive trigger events based on the above described schemes can cause different types of data storage maneuvers. In such embodiments, a trigger event based on the results of an NBA analysis can have a different effect on the data storage maneuvering as compared to a trigger event based on the results of a packet inspection and/or a heuristic algorithm. For example, an NBA-based trigger event can cause strategic or defensive changes in the data storage maneuvering so as to more aggressively counter such NBAs. The precise nature of such measures can depend on the nature of the threat, but can include a variety of responses. For example, different pseudorandom or chaotic algorithms can be selected, and/or the number of file attributes to be transformed can be increased. Also, the response can include increasing a frequency of data storage maneuvering. Accordingly, the data storage maneuvering described herein provides a method for changing a storage model, segmentation algorithm, transformation algorithm, and/or algorithm parameter in a purely spontaneous manner based on a variety of factors, thereby increasing the security of stored data.

Storage Model

The data storage maneuvering described herein is controlled in accordance with a storage model. The storage model is generally designed to give users and environments the ability to utilize cloud resources while providing control of "trust of access". The storage model also gives users the ability to add behavior to the storage of data. The dynamic nature of the present solution puts a heavy burden on adversaries to gather and exploit all of the data. This technique is additive in defense to existing storage architectures and concepts of operations ("CONOPS").

A storage model is a schema that defines and controls maneuverability within the context of (1) a network and/or an individual electronic device and (2) at least one security model. As such, the storage model can be represented as a data file that is communicated from a network controller (not shown) to one or more of the devices 102-106, 108, 110 and/or 114 of FIG. 1. The storage model is thereafter used by the device(s) to control the manipulation of data file attributes and coordinate its activities with the actions of the other devices in the network. The storage model gives centralized or distributed control to data stored dynamically. The storage model can be designed and tested prior to deployment to devices 102-106, 108, 110 and/or 114 of FIG. 1. The storage model can be modified and updated to provide an added layer of data maneuverability.

A schematic illustration of an exemplary storage model 800 is provided in FIG. 8. Storage model 130 of FIG. 1 can be the same as or similar to storage model 800. As such, the discussion of storage model 800 is sufficient for understanding storage model 130.

The storage model 800 comprises: source side information for selectively segmenting and transforming data files; and destination side information for reconstructing data files such that they can be provided to end users in their original form. Such source/destination side information includes, but is not limited to, data segmentation information 802 and data transformation information 810. The data segmentation information 802 generally specifies algorithms 804, trigger events 806 and rules 808 defining the desired data segmentation behavior of a system (e.g., system 100 of FIG. 1). Similarly, the data transformation information 810 includes DRT information 812, DCT information 820, DST information 828, and DSLT information 836. Each listed information 812, 820, 828, 836 specifies algorithms 814, 822, 830, 838, trigger events 816, 824, 832, 840, and rules 818, 826, 834, 842 defining the desired DRT, DCT, DST or DSLT behavior of a system (e.g., system 100 of FIG. 1). Embodiments of the present invention are not limited to the particulars of this example in which the source side and destination side information is contained in a single storage model 800. The source side and destination side information may alternatively be contained in at least two separate storage models.

The storage model 800 may additionally include the following information: timing information specifying when to use each segmentation algorithm and/or transformation algorithm; a mathematical function for dynamically generating new algorithm parameter values; rules specifying when to invoke the mathematical function for generating the new algorithm parameter values; rules specifying when to dynamically select which data file attributes are to be transformed; a rule specifying the number of data file attributes to be selected and which data file attributes are to be selected for transformation; a rule specifying whether data file attributes for a data file are to be changed synchronously or asynchronously; and a rule for dynamically varying the location within the computer network where the segmentation and/or transformations of data files takes place. In the synchronous scenarios, all selected data file attributes are changed at the same time by the same device. In the asynchronous scenarios, multiple transforms to the data files occur en-route. Stated differently, the group of data file attributes change incrementally as the data file travels through a network, i.e., at least one first data file attribute (e.g., file type) is changed by a first device (e.g., module 108 of FIG. 1) in the network and at least one second data file attribute (e.g., a data size) is changed by a second device (e.g., network node 114 of FIG. 1) in the network.

A storage model can be modified from time to time manually by a network administrator and/or automatically by the network controller (not shown) to update or change the way in which the network maneuvers to thwart potential adversaries. As such, the storage model may provide a network administrator and/or the network controller with a means for complete control over the time, place and manner in which data storage maneuvering will occur within the network. Such update ability allows the network administrator and/or the network controller to tailor the behavior of the system 100 to the current operating conditions and more effectively thwart adversary efforts to infiltrate the system 100.

Multiple storage models can be manually defined by a user and/or automatically generated by the network controller. The storage models can then be stored so that they are accessible to devices within system 100. For example, the multiple storage models can be stored at the network controller and communicated to devices 102-106, 108, 110 and/or 114 as needed. Alternatively, a plurality of storage models can be stored on each device 102-106, 108, 110, 114 and can be activated as necessary or desirable to maintain security of the network. For example, if the network administrator and/or network controller determines or suspects that an adversary has discovered a current storage model for system 100, the administrator and/or network controller may wish to change the storage model. Effective security procedures can also dictate that the storage model be periodically changed.

Module Operations

Figure 9:
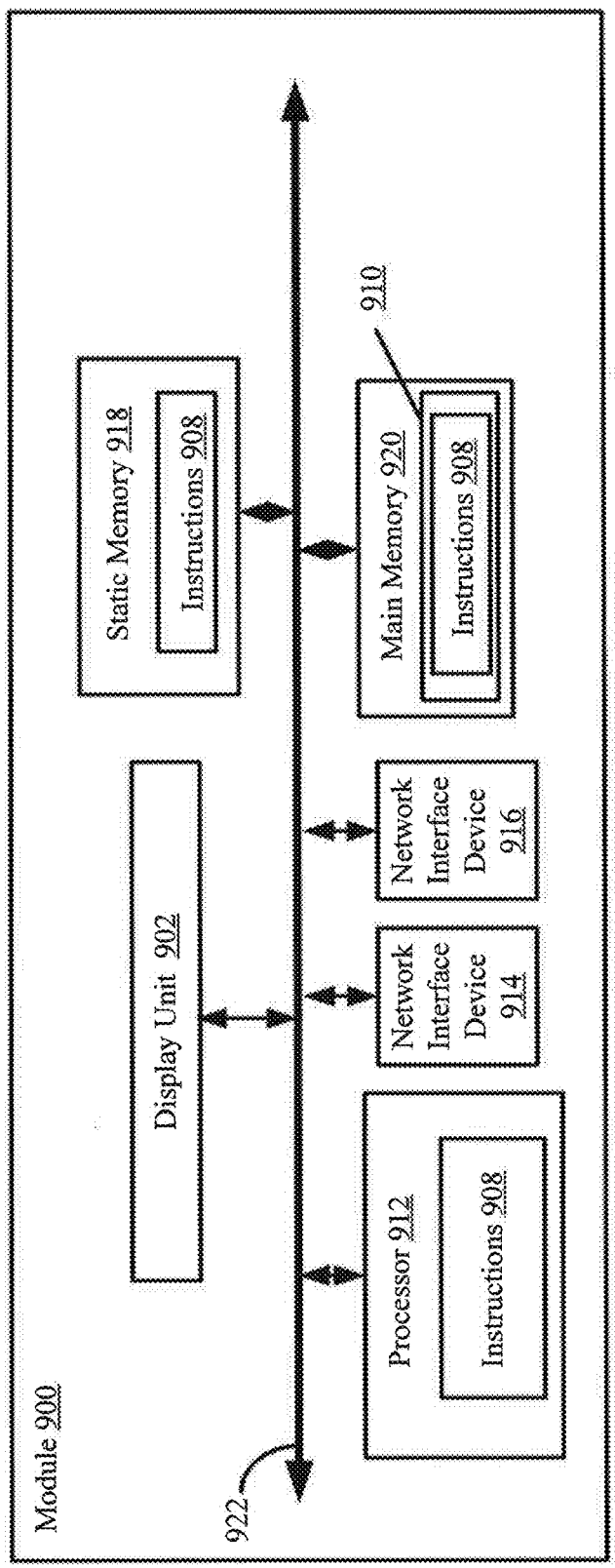
FIG. 9 is an example of a module that can be used in the present invention for performing dynamic data storage operations.

Referring now to FIG. 9, there is provided a schematic illustration of an exemplary architecture for a module 900 implementing the present invention. Module 108 and network nodes 110, 114 of FIG. 1 can be the same as or similar to module 900. As such, the following discussion of module 900 is sufficient for understanding module 108 and network nodes 110, 114.

As shown in FIG. 9, module 900 includes a processor 912 (such as a Central Processing Unit ("CPU")), a main memory 920 and a static memory 918, which communicate with each other via a bus 922. The module 900 can further include a display unit 902, such as a Liquid Crystal Display ("LCD") to indicate the status of the module. The module 900 can also include one or more network interface devices 914, 916 which allow the module to receive and transmit data concurrently on two separate data lines. The two network interface ports facilitate the arrangement shown in FIG. 1, where the module is configured to concurrently intercept and re-transmit data packets received from two separate computing devices in the system.

The main memory 920 includes a computer-readable storage medium 910 on which is stored one or more sets of instructions 908 (e.g., software code and at least one storage module) configured to implement one or more of the methodologies, procedures, or functions described herein. The instructions 908 can also reside, completely or at least partially, within the static memory 918, and/or within the processor 912 during execution thereof by the module. The static memory 918 and the processor 912 also can constitute machine-readable media. In the various embodiments of the present invention, a network interface device 916 connected to a network environment communicates over the network using the instructions 908.

Method For Dynamic Data Storage

Figure 10:
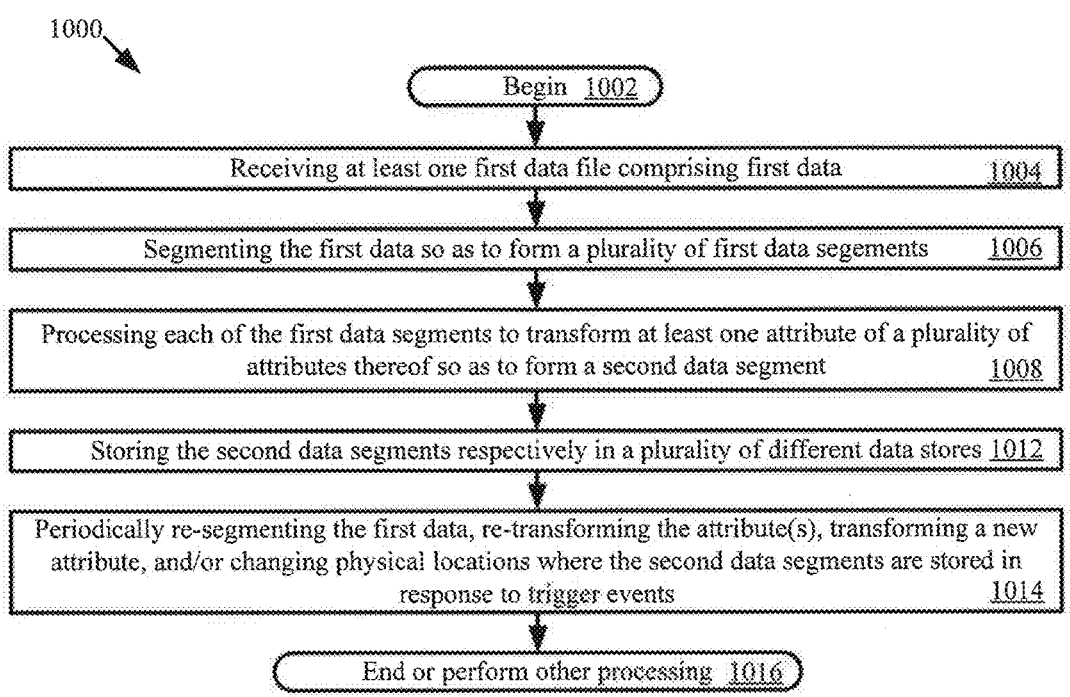
FIG. 10 is a flow diagram of an exemplary method for dynamic data storage.

Referring now to FIG. 10, there is provided a flow diagram of an exemplary method. 1000 for dynamic data storage. The method 1000 begins with step 1002 and continues with step 1004. In step 1004, at least one first data file (e.g., data file 202 of FIG. 2) is received at a network device (e.g., device 102, 104, 108, 110 or 114 of FIG. 1). The first data file comprises first data (e.g., data 302-320 of FIG. 3). Next in step 1006, the first data is segmented so as to form a plurality of first data segments (e.g., such as that shown by reference numbers $208_1$, $208_2$, $208_3$ of FIG. 2). Each of the first data segments is then processed to transform at least one attribute thereof so as to form a second data segment, as shown by step 1008. The attribute includes, but is not limited to, a data format, a file type, an encoding scheme, a cryptographic scheme, or a data size. In some scenarios, the first attributes of at least two of the first data segments are transformed in accordance with different algorithms.

The second data segments are stored respectively in a plurality of different data stores (e.g., data stores 116-120 of FIG. 1), as shown by step 1010. At some time later, step 1014 is performed where one or more of the following operations is(are) periodically performed: re-segmenting the first data; re-transforming the attribute(s); transforming a new attribute; and/or changing the physical storage locations of the second data segments. In some scenarios, at least one of a first attribute and a second different attribute is transformed each time the physical location is changed for a respective one of the second data segments. Alternatively or additionally, at least one of the first and second attributes is periodically re-transformed in accordance with a transformation algorithm which is different than at least one transformation algorithm used in a previous transformation thereof. The transformation algorithms used to transform the first and second attributes may be synchronously or asynchronously changed during operation of the network. Upon competing step 1014, step 1016 is performed where method 1000 ends or other processing is performed.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for dynamic data storage within a network, the method comprising:
   receiving at least one first data file comprising first data to be stored in at least one data store of the network;
   dynamically selecting a first storage model from a plurality of storage models that specifies a plurality of transformation algorithms for the first data based on at least one characteristic of the first data or the network, and at least one trigger event which is to trigger a transformation algorithm change;
   deciding whether to selectively bypass segmentation operations for the first data based on at least one of the first data file's size, a type of information represented by the first data, and a type of device from which the first data file was received;
   segmenting the first data so as to form a plurality of first data segments when a decision is made that the segmentation operations should not be bypassed;
   processing, by a first network node, each of the first data segments to transform at least one first attribute of a plurality of attributes thereof in accordance with a first transformation algorithm of the plurality of transformation algorithms so as to form a second data segment, where the plurality of attributes comprise at least one of a file type, an encoding scheme, a plain/cipher text state, a cryptographic scheme, a data file size, an inflation scheme, a data access scheme and a maneuver frequency;
   detecting the at least one trigger event;
   dynamically changing the first transformation algorithm to a second different transformation algorithm contained in the plurality of transformation algorithms, in response to the trigger event;
   processing, by a second network node, each second data segment to transform at least one second attribute of the plurality of attributes thereof in accordance with the second different transformation algorithm so as to form a third data segment; and
   storing the third data segments respectively in the plurality of different data stores;
   wherein at least the first and second network nodes perform transformations to the first data while the first data is en-route to the at least one data store.

2. The method according to claim 1, wherein the first attributes of at least two of the first data segments are transformed in accordance with different algorithms.

3. The method according to claim 1, wherein the first attribute is periodically re-transformed in accordance with a transformation algorithm which is different than at least one transformation algorithm used in a previous transformation of the first attribute.

4. The method according to claim 1, further comprising transforming a different attribute each time the physical location is changed for a respective one of the third data segments.

5. The method according to claim 1, wherein the second attribute is different than the first attribute.

6. The method according to claim 1, further comprising synchronously or asynchronously changing transformation algorithms used to transform the first and second attributes.

7. The method according to claim 1, further comprising: receiving a second data file comprising second data; and segmenting the second data file so as to form a plurality of fourth data segments in accordance with a segmentation scheme which is different than the segmentation scheme used to segment the first data file.

8. The method according to claim 1, wherein the trigger event is defined by at least one pre-defined rule stored within the network or a data store of an electronic device.

9. A system, comprising:
a first network node configured to
receive at least one first data file comprising first data,
dynamically select a first storage model from a plurality of storage models that specifies a plurality of transformation algorithms for the first data based on at least one characteristic of the first data or the network, and at least one trigger event which is to trigger a transformation algorithm change;
decide whether to selectively bypass segmentation operations for the first data based on at least one of the first data file's size, a type of information represented by the first data, and a type of device from which the first data file was received;
segment the first data so as to form a plurality of first data segments when a decision is made that the segmentation operations should not be bypassed; and
process each of the first data segments to transform at least one first attribute of a plurality of attributes thereof in accordance with a first transformation algorithm of the plurality of transformation algorithms so as to form a second data segment, where the plurality of attributes comprise at least one of a file type, an encoding scheme, a plain/cipher text state, a cryptographic scheme, a data file size, an inflation scheme, a data access scheme and a maneuver frequency;
a second network node configured to
process each second data segment to transform at least one second attribute of the plurality of attributes thereof in accordance with the second different transformation algorithm of the plurality of transformation algorithms so as to form a third data segment; and
a plurality of different data stores configured to store the third data segments respectively therein;
wherein at least the first and second network nodes perform transformations to the first data while the first data is en-route to the plurality of different data stores; and
wherein the first transformation algorithm is dynamically changed to the second different transformation algorithm in response to an occurrence of the at least one trigger event.

10. The system according to claim 9, wherein the first attributes of at least two of the first data segments are transformed in accordance with different algorithms.

11. The system according to claim 9, wherein the first attribute is periodically re-transformed in accordance with a transformation algorithm which is different than at least one transformation algorithm used in a previous transformation of the first attribute.

12. The system according to claim 9, wherein a different attribute is transformed each time the physical location is changed for a respective one of the third data segments.

13. The system according to claim 9, wherein the first and second network nodes are further configured to synchronously or asynchronously change transformation algorithms used to transform the first and second attributes.

14. The system according to claim 9, wherein the first or second network node is further configured to: receive a second data file comprising second data; and segment the second data file so as to form a plurality of fourth data segments in accordance with a segmentation scheme which is different than the segmentation scheme used to segment the first data file.

15. The system according to claim 9, wherein the trigger event is defined by at least one pre-defined rule stored within a network or a data store of an electronic device.

* * * * *